United States Patent [19]

Li

[11] Patent Number: 5,540,228

[45] Date of Patent: Jul. 30, 1996

[54] SYSTEM AND METHOD FOR TOPOGRAPHIC MAPPING OF ULTRASONIC IMAGE DISPLAYS

[75] Inventor: Ming Li, Seattle, Wash.

[73] Assignee: Siemens Medical Systems, Inc., Iselin, N.J.

[21] Appl. No.: 536,409

[22] Filed: Sep. 29, 1995

[51] Int. Cl.$^6$ ....................................................... A61B 8/00
[52] U.S. Cl. ................................. 128/660.07; 128/660.04
[58] Field of Search ........................ 128/660.07, 660.08, 128/660.09, 660.10, 661.01, 916, 660.04, 660.05, 661.09, 661.10

[56] References Cited

U.S. PATENT DOCUMENTS 5,375,600  12/1994  Melton, Jr. et al. ............... 128/661.09
5,485,843   1/1996  Greenstein et al. ............... 128/661.09

*Primary Examiner*—George Manuel
*Attorney, Agent, or Firm*—Jeffrey Slusher

[57] ABSTRACT

An interrogation region of a patient's body is scanned with an ultrasonic probe. At least one input data frame is generated representing the scanned interrogation region as a pattern of image elements, each with a corresponding input intensity value, that are stored in a memory. The input data frame is then displayed as a pattern of displayed intensity values, which the processor calculates as combination of a geometry-independent function of an ambient light input array and a geometry-dependent function of the input intensity values, in which the geometry-dependent function includes a coefficient term that multiplies the input intensity array and that itself is a function of the input intensity values. As part of the coefficient term is a filtered input data array, which results from noise-floor filtering, low-pass filtering, and surface normal vector averaging of the input intensity array. In a preferred embodiment of the invention, the user selects an assumed light source vector, and/or an assumed viewer direction vector, which are the incorporated into the geometry-dependent function used to calculate displayed intensity values.

14 Claims, 4 Drawing Sheets

SYSTEM AND METHOD FOR TOPOGRAPHIC MAPPING OF ULTRASONIC IMAGE DISPLAYS

BACKGROUND OF THE INVENTION

1. Field of the Invention

This invention involves a method for displaying images derived from ultrasonic scans and a corresponding processing and display system.

2. Description of the Related Art

Displayed images obtained by ultrasonic scanning are often difficult to see clearly. The difficulties are typically of two types. First, since the resolution of an ultrasound scan is usually much less than for, say, an X-ray image or even a normal television picture, an operator may have trouble making out the edges of even well-defined structures, such as the boundaries of organs. This is often made worse by the low-intensity noise that "clouds" the image. Second, in the context of medical ultrasonic imaging, scan data is often presented to the sonographer in such a way that 2-D displays of sections of scanned 3-D regions often fail to give the user any sense of the 3-D structure of the region.

In conventional systems, the intensity values of displayed image elements are sometimes adjusted depending on the results of, for example, edge-detection and speckle-reduction procedures. These systems often ignore, however, the fact that a "true" display of intensities doesn't always most clearly emphasize the structural features of the scanned region.

What is needed is therefore a way of displaying an ultrasonic image in which the effect of low-level noise is reduced, and that better brings out structural features in the image.

SUMMARY OF THE INVENTION

According to the invention, an interrogation region of a patient's body is scanned with an ultrasonic probe, which senses return signals from the interrogation region. At least one input data frame is generated representing the scanned interrogation region as a pattern of image elements, each with a corresponding input intensity value, that are stored in a memory. The input intensity values are stored as an input intensity array. A pattern of displayed intensity values is then generated as a combination of a predetermined geometry-independent function of the input intensity values and a predetermined geometry-dependent function of the input intensity values, wherein the geometry-dependent function includes a coefficient term that multiplies the input intensity array and that itself is a function of the input intensity values. The scanned interrogation region is finally displayed as the pattern of displayed intensity values.

For each image element, the processor preferably calculates an intensity surface normal vector and then generates the pattern of displayed intensity values also as a predetermined function of the intensity surface normal vectors, which are included in the geometry-dependent function. The surface normal vector for each image element is preferably set to an average of the intensity surface normal vectors for a region of image elements that surround and include the element.

As a refinement to the invention, for each image element whose input intensity value is less than a predetermined intensity threshold value, the corresponding input intensity value is preferably set to a predetermined intensity default value before the intensity values are used in the geometry-dependent function.

In the preferred embodiment of the invention, the input intensity values are low-pass filtered before the displayed intensity values are generated and before the intensity values are used in the geometry-dependent function.

The user preferably selects an assumed light source vector and an assumed viewer direction vector. The pattern of displayed intensity values is then generated also as a predetermined function of these vectors, which are included in the geometry-dependent function.

The geometry-independent function preferably includes a user adjustable or prestored ambient light radiance coefficient.

DETAILED DESCRIPTION

Figure 1:
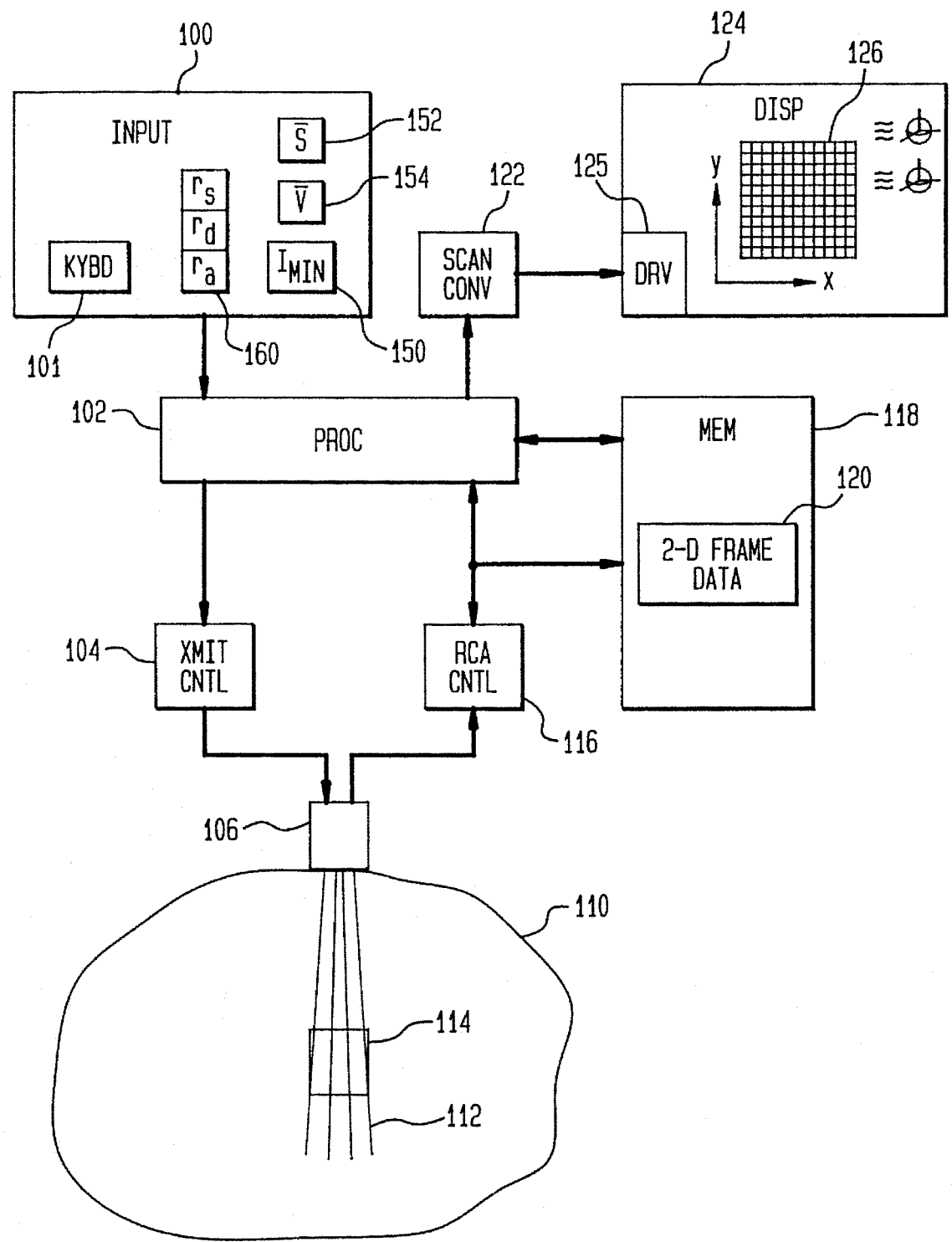
FIG. 1 illustrates an ultrasonic imaging system according to the invention.

FIG. 1 illustrates the main components of an ultrasonic imaging system according to the invention. The user enters the various conventional scan parameters into an input unit 100, which typically includes such devices as a keyboard 101, knobs, and buttons. The input unit is connected to a processing system 102, which will typically be an electrically connected and cooperating group of processors such as microprocessors and digital signal processors; the processing system may, however, also be implemented by a single processor as long as it is fast enough to handle the various tasks described below.

As in known systems, the processing system 102 sets, adjusts, and monitors the operating parameters of a conventional transmission control circuit 104, which generates and applies electrical control and driving signals to an ultrasonic probe 106, which includes an array of piezoelectric elements. As is well known in the art, the piezoelectric elements generate ultrasonic waves when electrical signals of the proper frequency are applied to them.

By placing the probe 106 against the body of a patient, these ultrasonic waves enter a portion 110 of the patient's body. By varying the phasing, amplitude, and timing of the driving signals, the ultrasonic waves are focussed to form a series of scan lines 112 that typically fan out from the probe. Several such scan lines are shown extending into the patient's body in FIG. 1. A region of interest, that is, the region that the user wants to have an image of, is shown as an interrogation region or volume 114. The manner in which ultrasonic scanning signals are controlled, generated, and applied to a patient's body is well understood in the art and is therefore not described further.

Ultrasonic echoes from the waves transmitted into the body return to the array in the probe 106. As is well understood, the piezoelectric elements in the array thereby convert the small mechanical vibrations caused by the echoes into corresponding electrical signals. Amplification and other conventional signal conditioning is then applied to the return signals by a reception controller 116. This processing includes, as needed, such known signal conditioning as time-gating, gain compensation, and diffraction compensation, in order to identify the echo signals that correspond to each scan plane of the interrogation volume 114.

The reception controller 116, all or part of which is normally integrated into the processing system 102 itself, converts the ultrasonic, radio-frequency (RF) return signals (typically on the order of a few to tens of megahertz) into lower frequency ranges for processing, and may also include analog-to-digital conversion circuitry. This is well known in the art of ultrasonic imaging. The down-converted power values for the two-dimensional interrogation region are stored in a memory 118 as 2-D frame data 120, after conventional beamforming. Each set of frame data corresponds to one image frame, that is, to a 2-D cross section of the interrogation volume. Each frame of the image is represented and stored digitally as an array of acoustic power or intensity values for the image elements that make up the frame.

The interrogation region is normally not in the same shape as what the user wants to see displayed, and even when it is, the digital acoustic intensity values formed into beams are normally not in a form suitable for driving a conventional gray-tone or color display directly. The acoustic intensity values for an image frame are therefore applied to a conventional scan converter 122, which converts the digital acoustic values into display intensity or brightness values that are suitable for driving a display device 124. The display device 124 typically includes a conventional display driver 125 and a screen 126 (for example, LED or CRT) that is divided into an X-Y matrix or pattern of picture elements or "pixels" that make up an image that the user can view and interpret.

The image is displayed as a pattern of image elements that correspond to the received intensities from corresponding portions of one 2-D frame of data from the interrogation region. Note that a displayed image element will often be made up of more than one pixel, but that this will depend on the relative resolutions of the scan and of the display. The invention does not require any particular relative resolution.

Ultrasonic imaging may be done in any of several modes. Two common modes are the power or power-Doppler mode and the color mode. In the power-Doppler mode, the display is typically gray-tone, and the displayed intensity of each pixel corresponds to the amplitude of the power of the return signal from a corresponding element or portion of the interrogation region. In other words, the stronger the acoustic echo is (in amplitude, degree of Doppler shift, or some other conventional signal characteristic) from a portion of the scanned region, the more brightly it is displayed. In this description of the invention, all such measures of echo strength are referred to as "intensity" for the sake of simplicity. Note that it is also possible to display intensity data using "pseudo-colors," that is, such that different intensities (or intensity intervals) are displayed using different assigned colors. For example, increasing intensity can be displayed as increasingly more red.

Figure 2:
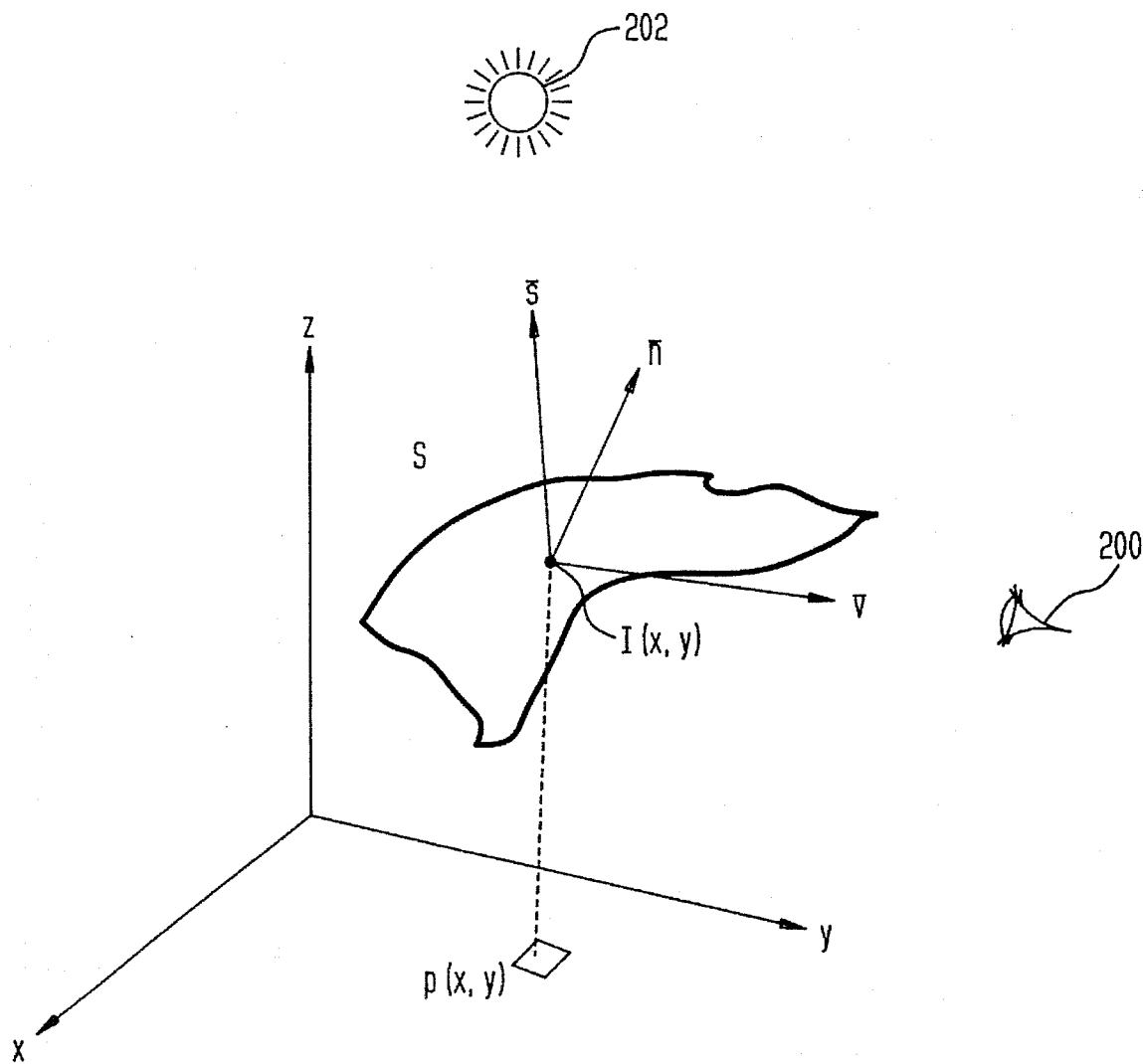
FIG. 2 illustrates a coordinate system, a display intensity surface and various vectors used in the description of the invention.

The intensity values can be thought of as points I(x,y) (above the x-y display plane) on a 3-D intensity surface S. FIG. 2 illustrates this surface, as well as certain vectors used in the invention. The surface S is shown as continuous and smooth merely for the sake of easy explanation and illustration. It is to be understood that the set of intensity values is discontinuous and would more accurately be represented as a group of flat-topped "pillars" extending up from the X-Y plane. A "point" I(x,y) on the surface S represents the intensity (height in the Z-direction) for the corresponding image element p(x,y).

FIG. 2 shows an X-Y-Z coordinate system, as well as the position of a hypothetical or assumed observer or viewer 200, and of a hypothetical or assumed light source 202, which is assumed to "illuminate" the displayed region. Vectors $\bar{v}$, $\bar{s}$, and $\bar{n}$ point from the point I(x,y) in the direction of the assumed viewer 200, the assumed light source 202, and the surface normal, respectively.

The viewer 200 and light source 202 are "hypothetical" or "assumed" because they do not necessarily correspond to the position of the actual user who is viewing the display screen or the dominant light source in the room where the ultrasound scan is taking place. Rather, the vectors $\bar{v}$ and $\bar{s}$ are user-adjustable input parameters to the processor 102 in order for it to generate the displayed image with the shading it would have if the surface S were being viewed from the direction $\bar{v}$ and the surface were illuminated from the direction $\bar{s}$.

The two paintings, *Aristotle with a Bust of Homer* by Rembrandt van Rijn (1653) and *Lise with a Parasol* by Pierre-Auguste Renoir (1867) illustrate the concepts. In *Aristotle with a Bust of Homer*, the source of light is not actually shown in the painting, but is assumed by the artist to be located at about the ten o'clock position, slightly in front of the plane of the canvas; the viewer is assumed to be looking roughly straight into the plane. The background, or ambient lighting, is very low, such that the painting appears "dark" except for areas illuminated by the assumed light source. In *Lise with a Parasol*, however, Renoir assumes a light source located at about the one o'clock position, with the viewer looking slightly at the right side of the woman. Since *Lise with a Parasol* is set in a sunny day—after all, she's using a parasol—the ambient light is much brighter than in Rembrandt's painting of somber philosophers.

Although most paintings are best viewed from a particular position and with a particular lighting in the gallery, note that the positions of the art lover standing before the work and of the gallery's light source are usually not the same as the positions of the painter and light source as depicted in the work itself. In the context of FIG. 2, the surface S would be the subject, $\bar{v}$ would be the direction vector from the subject to the artist, and $\bar{s}$ would be the direction vector from the subject to the light source actually or assumed to be illuminating the subject. In the invention, the sonographer corresponds to the art lover, the examination room lights correspond to the gallery lighting, the processing system 102 corresponds to the artist, the transducer corresponds to the brush, the display screen 126 corresponds to the canvas, and the interrogation region 114 corresponds to the subject.

For both paintings, the respective artists used real people as subjects, and one can safely assume that the artists moved their subjects, the lighting they had in the studio, and their own easels many times to get just the proper spatial relationship between the light source, the subjects, and themselves. Furthermore, the artists also chose the intensity of the ambient light used to illuminate their subjects and backgrounds generally. By changing these relationships, the shading of the subjects changed, and different features of the subjects and their surroundings gained greater or lesser sharpness and visibility. The invention allows the user to "change" and "move" the lighting and the "artist's" position electronically and so to have the interrogation region displayed in such a way that structural features (such as edges and boundaries of organs, blood vessels, tumors, and other tissue structures) can most easily be detected and analyzed.

The surface S represents an input image, with the height above the X-Y plane representing intensity. Each input image represents a 2-D "slice" of the interrogation region. The user of this invention may select which image to view and process using any conventional devices and techniques. The invention allows the improvement of one image at a time, under user control.

In the context of displaying ultrasonic image information, the X-Y plane corresponds to the plane of the display screen 126. The input image can come from any of several sources in the ultrasound device: from the in-phase and quadrature (I/Q) signals taken directly from the probe 106, pre- or post-scan conversion image data, and video frame data immediately before display. In the following description, $I_{in}(x,y)$ is the intensity of the input image element at point p(x,y).

According to the invention, the intensities $I_{disp}(X,y)$ with which image elements are displayed are a function f of ambient light that is independent of the geometry of surface S, plus a function g of a filtered input intensity array $I_f$ that does depend on the geometry of the surface S, and that takes into account the user and geometry-determined effect of diffuse and specular lighting. Thus:

$$I_{disp}(x, y) = f(I_a(x,y)) + g(I_f(x,y)) \cdot I_{in}(x,y) \quad \text{(Equation 1)}$$

Although the specifics of this formula are described below, two points are worth keeping in mind. First, the function g, which acts as a coefficient for the "raw" input data $I_{in}(x,y)$, is itself a function of $I_{in}(x,y)$ rather than being a constant or a single parameter; indeed, the "raw" input array is multiplied by a function of itself. Second, the formula has the general form of a weighted average.

Ambient light adjustment

The first term in the expression for $I_{disp}(X,y)$ is $f(I_a(x,y))$, where $I_a = I_a(x,y)$ is an ambient intensity input array which, in most applications, will be equal to $I_{in}(x,y)$, although it is possible according to the invention for the input data to be altered in any other conventional way before compiling $I_a(x,y)$. As is described in greater detail below, $f(I_a(x,y)) = r_a \cdot I_a(x,y)$ where $r_a$ is a preset or user-adjustable radiance coefficient for ambient light.

If the term $g(I_f(x,y))$ is reduced to zero, the term $r_a \cdot I_a(x,y)$ alone determines the displayed image, regardless of the geometry of the intensity surface. If $r_a$ is set to 1.0, then $I_{disp}(x,y)$ will be equal to $I_a(x,y)$; otherwise, as $r_a$ is reduced, the displayed values are "scaled" down by the factor $r_a$. As such, $I_a(x,y)$ forms a "default" display, adjusted for ambient light. Since one may want to apply other procedures such as filtering, shading, coloring, or scaling to create the "default" display, $I_a$ may not always be exactly the same as $I_{in}$.

Geometry-dependent filtering

The filtered input image array $I_f$ is derived from the "raw" input image array $I_{in}$ in a series of three main steps, some of which are optional: 1) noise floor filtering; 2) low-pass filtering; and 3) surface normal vector averaging. These steps are described below.

Noise-floor filtering

If each intensity in $I_{in}(x,y)$ is represented as an n-bit data word, then $2^n$ different intensities can be displayed. For an 8-bit word length, each element of $I_{in}(x,y)$ would thus fall in the range [0,255]. Below a certain intensity threshold value $I_{min}$, however, one can reasonably assume either that the image element is noise, or that it contributes so little to the ability to distinguish structure in the image that it can be treated as noise. According to the invention, the user therefore adjusts $I_{min}$ using any conventional device 150 such as a slide (implemented either in hardware or as a conventional display icon that the user adjusts by pointing a cursor under the control of a mouse or trackball or via a touch-screen), a knob, or a numerical entry via the keyboard. The processor then sets all values of $I_{in}(x,y)$ that fall below $I_{min}$ either to some experimentally predetermined, preferably small constant intensity default value $I_e$, which is preferably zero.

Thus, after the step of noise-floor filtering:

$$\begin{aligned} I_f(x,y) &= I_{in}(x,y) && \text{if } I_{in}(x,y) \geq I_{min} \\ &= I_e = \text{(preferably) 0} && \text{if } I_{in}(x,y) < I_{min} \end{aligned}$$

Low-pass filtering

As is explained further below (see also FIG. 2) the invention calculates and uses a surface normal vector, which involves taking the derivative of the intensity surface S in the X and Y directions. In order to reduce the effect of higher-frequency noise such as speckle on such calculations, the noise floor-filtered image $I_f(x,y)$ is preferably 2-D low-pass filtered. This filtering step thus "smooths" the $I_f(x,y)$ surface. There are many known routines for discrete 2-D low-pass filtering of array data, and any known method may be used according to the invention. In general, these methods assign to each array element a value that is a weighted average of the values of elements in a predefined region about the element; the weights are usually proportional to the distance of the surrounding elements from the element of interest, and certain routines calculate and use functions of various derivatives in the surface near the element of interest. Normal experimentation and simulation may be used to determine which conventional routine provides the best trade-off between surface smoothing and information loss. At the end of this step, $I_f(x,y)$, which previously was noise-floor filtered, is set equal to $LP(I_f(x,y))$, where $LP(.)$ indicates low-pass filtering.

Surface Normal Vector Averaging

As FIG. 2 illustrates, the invention makes use of the surface normal vector ñ in adjusting the intensity of each image element based on the geometry of the intensity surface S. This proceeds in three sub-steps. First, at each point (x,y), the derivative of $I_f(x,y)$ (after low-pass filtering) is calculated in the row and column directions using any known numerical technique. For each point (image element) at (x,y), the processor therefore calculates the gradient or derivative vector $dI_f(x,y) = (dx, dy, 1)$ where $$dx = \frac{\partial I_f}{\partial x} \quad \text{and} \quad dy = \frac{\partial I_f}{\partial y}$$

The processor then calculates a normalized surface normal vector ñ(x,y)

$$\hat{n} = (nx, ny, nz) = \frac{dI_f}{|dI_f|} \quad \text{where } |dI_f| = \sqrt{dx^2 + dy^2 + 1}$$

As is well known, the process of differentiation tends to amplify the effect of noise, and this effect may be particularly pronounced for already noisy ultrasound scan data. The effect of surface unevenness is reduced in part by the previous step of low-pass filtering (which smoothes the surface), but to reduce the effect on surface normal calculations even more, the surface normal for each element is preferably calculated as a weighted average of the surface normal vectors of the image elements in a region around the current element of interest. For example, a 3×3 or 5×5 element region could be chosen, such that the current element is the center element. The surface normal vectors for the nine or 25 elements in the region would then be averaged and the average value would be assigned as ñ(x,y) for the current element. Since it can be assumed that the intensity surface S defined by $I_f(x,y)$ would be reasonably smooth in the absence of noise, the vector averaging may be unweighted; if experiments for a particular application indicate otherwise, however, suitable weights may be chosen using known methods.

Note that this step of determining surface normals may be combined with the step of low-pass filtering, but that these operations are not commutative.

Parameter input

As the analogy above to the two works by Rembrandt and Renoir points out, the invention allows the user to adjust lighting and viewing angles and conditions electronically in order to improve the ability to discern structural features in the display. In order to calculate not only the geometry-independent ambient lighting factor $r_a \cdot I_a$ but also the geometry-dependent factors, the processor requires certain parameters. These parameters may either be pre-set in the memory 118 and accessible to the processor 102, or may be input and adjusted by the user, preferably while she is viewing the display in order to show immediately the effect on the display of the adjustments:

$r_a$, $r_d$, $r_s$: Radiance coefficients for ambient light, diffuse light, and specular light, respectively, each preferably scaled to lie in the range [0, 1]. The concepts of ambient, diffuse and specular light are well understood in the prior art, as are such coefficients. According to the invention, conventional experimentation may be applied to determine optimal, or at least suitable values for these coefficients for different expected applications of the invention. These parameter values may then be pre-stored in the memory unit 118 or in other memory circuitry (if included) in, for example, the display driver. It is also possible according to the invention, however, for the user to set these parameters, preferably by entering them into memory via a conventional input device 160 (such as for $I_{min}$). It is also possible to have dedicated input devices (or keyboard entries) for each radiance coefficient, and one or more of the coefficients may be preset, with the others being user-adjustable.

As yet another alternative, the memory 118 may contain a table of radiance coefficients for each of several different types of ultrasonic examinations, such as for cardiac scans, fetal scans, Doppler flow scans, with transducers of different frequencies, and so on. The coefficient table may be determined by normal experimentation and pre-stored, or it may store the most recent choices made by the user for each particular examination type. If different sets of radiance coefficients $r_a$, $r_d$ and $r_s$ are stored in memory, the user may select the proper set for the current examination type in any known manner. For example, the user may identify the type of examination by a suitable entry via the keyboard, or the processor may display a menu of examination types, from which the user selects using a standard pointing device.

Figure 3:
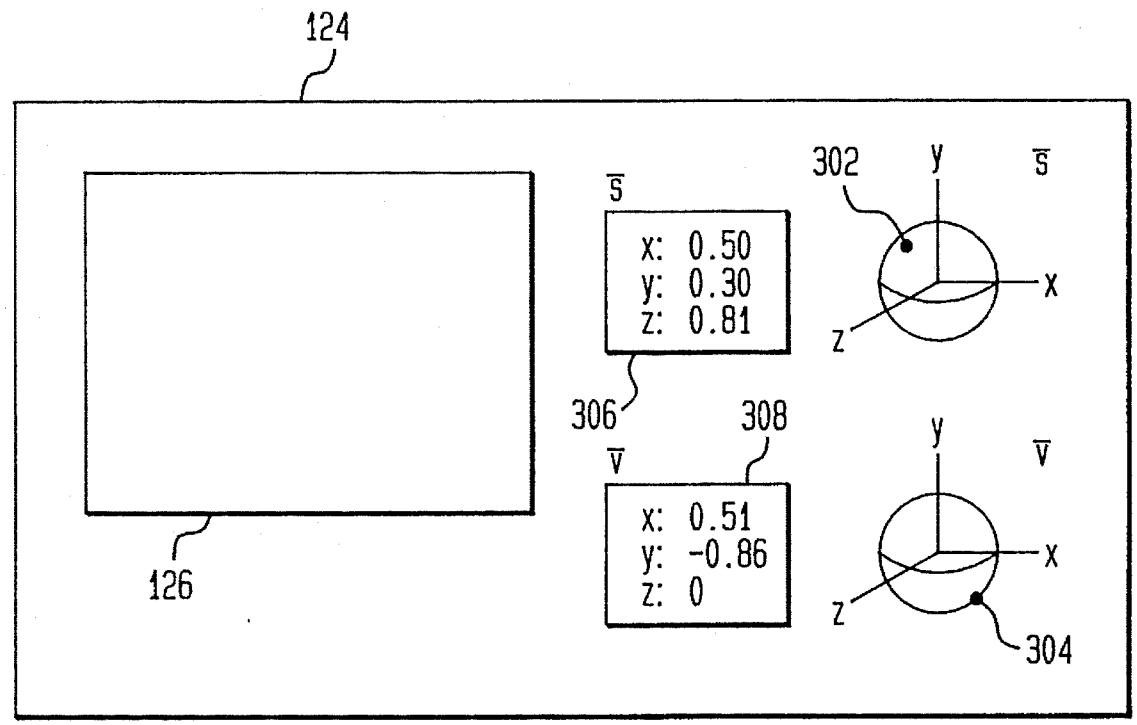
FIG. 3 illustrates one way for the user to select assumed light source and viewer vectors used by the invention to present an ultrasonic image.

$\bar{v}$, $\bar{s}$: viewer and light source direction vectors, respectively. (See also FIG. 2 and the associated discussion.) Since there are similar alternatives for determining these vectors, they are discussed together. In order to specify a vector, a reference coordinate system X-Y-Z must be chosen, and according to the invention, this can be done in any conventional manner, although it is most convenient for the X-Y plane to be the plane of the display screen. FIG. 3 illustrates one advantageous way for the user to select $\bar{v}$ and $\bar{s}$. For each direction vector, an X-Y-Z coordinate system is displayed, as well as images of spheres centered on the origins of the respective coordinate systems. Dots or other marks 302, 304 (which may be connected by line segments to the origins to better indicate vectors) are displayed on the spheres corresponding to the position of the assumed light source and viewer relative to the reference coordinate system. Marks on the "back" or "hidden" hemispheres may, for example, be indicated in a different color. The positions of the marks on the spheres define the respective vectors in the reference coordinate system.

In order to help the user see quantitatively the values of $\bar{s}$ and $\bar{v}$, for example, so that she can record them for future use, the display preferably includes fields 306, 308 in which the X-Y-Z coordinates of the marks 302, 304 are indicated. In the illustrated case, $\bar{s}$=(0.50, 0.30, 0.81) and $\bar{v}$=(0.51, −0.86, 0.0). In other words, the user has selected an assumed viewing position in the plane of the display screen (the z-coordinate of $\bar{v}$ is 0.0) "below" and at right angles to the light source ($\bar{v} \cdot \bar{s}$=0). As the marks are moved, these values will change.

There are alternative ways in which the user may adjust $\bar{s}$ and $\bar{v}$. In FIG. 1, dedicated input devices 152, 154 are shown for $\bar{s}$ and $\bar{v}$, respectively. The user could, for example, enter the numerical values of the vector elements into the processor via the keyboard 101 (FIG. 1). This may be efficient if the best values are known, for example, from previous examination sessions, but in general this will be needlessly time-consuming and tedious. Another way would be to include a potentiometer slide or knob, calibrated from −1 to +1, for example, for each element of each vector, for a total of six. This would speed up the adjustment process, but would obviously clutter the input device 100 (FIG. 1) with such devices, unless they could be used for other purposes as well. The slides could, however, be implemented as displayed icons with up-down arrows and controlled by a trackball or mouse and a cursor and conventional activation keys.

Still another way to enter $\bar{s}$ and $\bar{v}$ would be to use a mouse or trackball, whose position corresponds to a position on the "visible" hemisphere. Depressing a standard button or key could then indicate to the processor that the respective mark is to be moved to the "hidden" hemisphere. The vectors $\bar{s}$ and $\bar{v}$ are preferably normalized, so by specifying the position of a mark in the X-Y plane of the visible display within the outline of the respective sphere, its extension in the Z direction is determined, since the mark is constrained to lie on the surface of the sphere. (The processor simply sets $z=\pm(x^2+y^2)^{1/2}$, with the sign determined by whether the mark is on the front (+) or "hidden" (−) hemisphere.

As yet another alternative, a conventional 3-D mouse could be attached to the input device; the position of the mouse in space relative to a predetermined origin (set, for example, by clicking a mouse button) would then correspond to the position of each mark on the respective sphere.

Since the magnitude of the direction vectors contains no information used in the invention, the vectors $\bar{s}$ and $\bar{v}$ are preferably normalized. If, as in the example illustrated in FIG. 3, the input is configured such that they are constrained to lie on unit spheres, then normalization will already have been performed to generate the displayed position of the marks. If, on the other hand, it is found to be easier for the user to operate with integers, then the vectors should be normalized to unity magnitude in any known manner (by dividing them by their respective magnitudes). In the following discussion the normalized light source and viewer direction vectors are referred to as $\hat{s}$ and $\hat{v}$, respectively.

Figure 4:
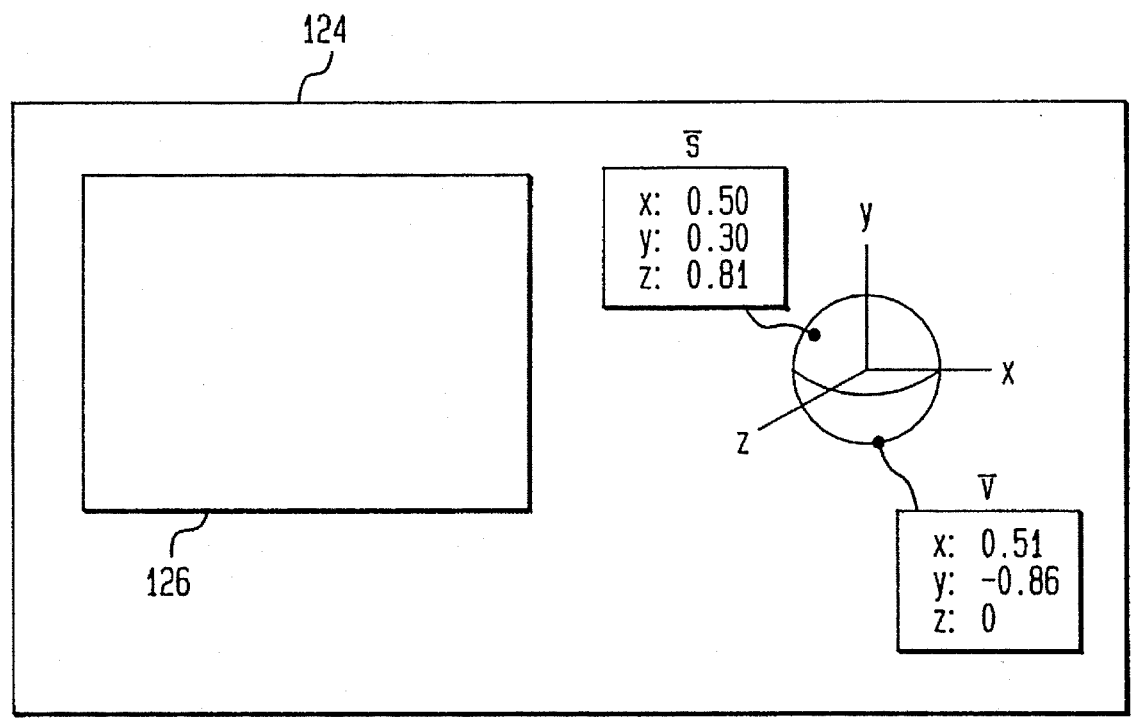
FIG. 4 illustrates a simplified alternative to the selection method shown in FIG. 3.

FIG. 4 shows an input display with a single coordinate system and "input sphere" for both vectors $\bar{v}$ and $\bar{s}$. In this simplified display separate marks are displayed simultaneously for the different vectors. The positions of the numerical value fields may either be fixed, or the processor may move them so that they are near the respective mark.

Depending on the application, it may be sufficient to prescribe one or the other of the vectors $\bar{v}$ and $\bar{s}$, so that the user need only specify the one not set as a constant. It is preferred, however, that both vectors be user-adjustable to provide the greatest flexibility for finding the display shading that best brings out the structural features of the displayed image frames, and allows for changes when viewing different frames.

Display mapping

Once the user has specified the parameters described above, the processor may proceed to adjust the intensity values of the displayed image elements according to the following preferred relationship:

$$I_{disp}(x,y) = I_a(x,y)r_a + I_{in}(x,y) \cdot [r_d(\hat{s} \bullet \hat{n}) + r_s(\hat{r} \bullet \hat{v})]$$

where the dot • indicates the vector dot product and:

$I_{disp}(x,y)$=the intensity with which the image element at position (x,y) is displayed on the screen 126;

$I_{in}(x,y)$=the input intensity value for the input image element at position (x,y);

$\hat{r}=\hat{r}(x,y)$=a normalized reflection vector for specular lighting, defined as follows:

$$\hat{r} = \frac{\bar{r}}{|\bar{r}|}$$

where $\bar{r}=2(\hat{n} \bullet \hat{s})\hat{n} - \hat{s}$, and $|\bar{r}|$=the magnitude of $\bar{r} = \sqrt{+e, ovs\, \bar{r}.\bar{r}}$ The expression for $I_{disp}$ has three main parts, which adjust the displayed intensity based on ambient, diffuse, and specularly reflected light from the assumed light source.

$I_a \cdot r_a$

The term $I_a \cdot r_a$ has been described above. It expresses the contribution of ambient light to the display. As the name implies, the ambient light intensity indicates the general level of brightness common to all elements in the displayed image, regardless of the actual measured intensity of their ultrasonic return signals and regardless of their position relative to the assumed light source. As such, $r_a$ is constant for all elements in the display, although $r_a$ is a parameter that is optionally user-adjustable.

$I_{in} \cdot r_d \cdot (\hat{n} \bullet \hat{s})$

This term expresses the contribution of diffuse light, which is different depending on the local surface normal $\hat{n}$ of the image element. If $r_d=0$, then this contribution will be nil. Likewise, if $\hat{s} \bullet \hat{n}=0$, then the expression also reduces to zero, whereas, if $\hat{s} \bullet \hat{n}=1$, then the image element will receive the full contribution of diffuse light, controlled only by the radiance coefficient $r_d$. This agrees with what one would expect: if the local tangent plane is perpendicular, that is, is "turned sideways" relative to the light, then it will get no diffuse light, whereas, if it directly faces the light source, then it will get the maximum amount of diffuse light.

$I_{in} \cdot r_s \cdot (\hat{r} \bullet \hat{v})$

This term expresses the contribution of light that is reflected specularly from the light source, off of the surface at the point (x,y) and toward the assumed viewer. As with $r_d$, $r_s$ determines the maximum possible influence of this contribution. Expanding this expression (ignoring the constant factors $I_{in}$, $r_s$, and $|\bar{r}|$) gives more insight:

$$I_f r_s = \bar{r} \bullet \hat{v} = [\, 2 \cdot (\hat{n} \bullet \hat{s})\hat{n} - \hat{s}] \bullet \hat{v} = 2 \cdot (\hat{n} \bullet \hat{v}) - (\hat{s} \bullet \hat{v})$$

As this shows, if any two of the three vectors $\hat{n}$, $\hat{s}$ and $\hat{v}$ are parallel, then the whole term reduces to zero, which is the minimum value for the expression. This corresponds to the case of a person, a very small mirror, and a light beam: if the light beam lies in the plane of the mirror then the viewer will not see reflected light no matter where he stands, since the light is never reflected; if the viewer is looking in the plane of the mirror (straight into its "edge") he will not see the light reflected regardless of where it's located; and if the viewer is looking along the light beam he will only see the beam if it is perpendicular to the mirror, otherwise, not at all. The maximum value of the expression $\hat{r} \bullet \hat{v}$ is 1.0, which is achieved only when $\hat{r}$ is parallel to $\hat{v}$, which occurs when all three vectors are parallel aligned (the viewer is looking straight into the mirror along the light beam, which is normal to the mirror's surface). The value of the expression will lie between these two extreme values whenever no two of the vectors are parallel.

Scaling

Equation 1 shows the preferred relationship between the input and displayed intensity values for the scanned interrogation region. In order to guarantee that the displayed intensity values $I_{disp}(X,y)$ are distributed within a predetermined range, for example, to use the full 256-value range in an 8-bit data word, the values of $I_{disp}$ may be scaled by a predetermined constant or normalized by a calculated constant, in which case $I_{disp}$ is proportional to the right-hand side of Equation 1 rather than being strictly equal to it. One example of normalization would be to determine the maximum value of $I_{disp}(X,y)$, then to divide all elements of $I_{disp}(X,y)$ by this value, and then to set each element of $I_{disp}(X,y)$ equal to a predetermined or user-adjustable (using input devices such as those described for $I_{min}$) maximum display intensity $I_{max}$ (for example, 256) times the "normalized" $I_{disp}$ values. Whether to include such a scaling step will depend on the application or on the particular scan, and may be decided on based on conventional observation and experimentation.

The processor then passes to the display driver 125 the updated display values $I_{disp}(X,y)$. The processor preferably monitors the status of the various input devices in a conventional manner and whenever it senses a change in any input parameter, it recomputes $I_{disp}$ for the currently displayed image frame with the new parameters. This means that the user can view the display, make changes, for example, in $\bar{s}$ and $\bar{v}$, view the new display, and continue to make changes until the image structures are most clearly visible. The user can then direct the image to be stored for later use and/or printed in any known way.

If the user wishes to examine individual frames, rather than retaining a set of shading parameters over several display frames, the user can then select a new image frame (once again, in any known way). The processor then preferably either assigns predetermined default values for the various input parameters so that the user can adjust them anew, or it may display the new frame using the most recently entered parameters. This latter method is preferred, since nearby frames are often similar enough in structure and input intensity that their parameters will also be similar, and retaining parameter values will therefore normally mean less user effort. It is also possible to select which of these updating options the user prefers by means of a normal keyboard entry.

Figure 5:
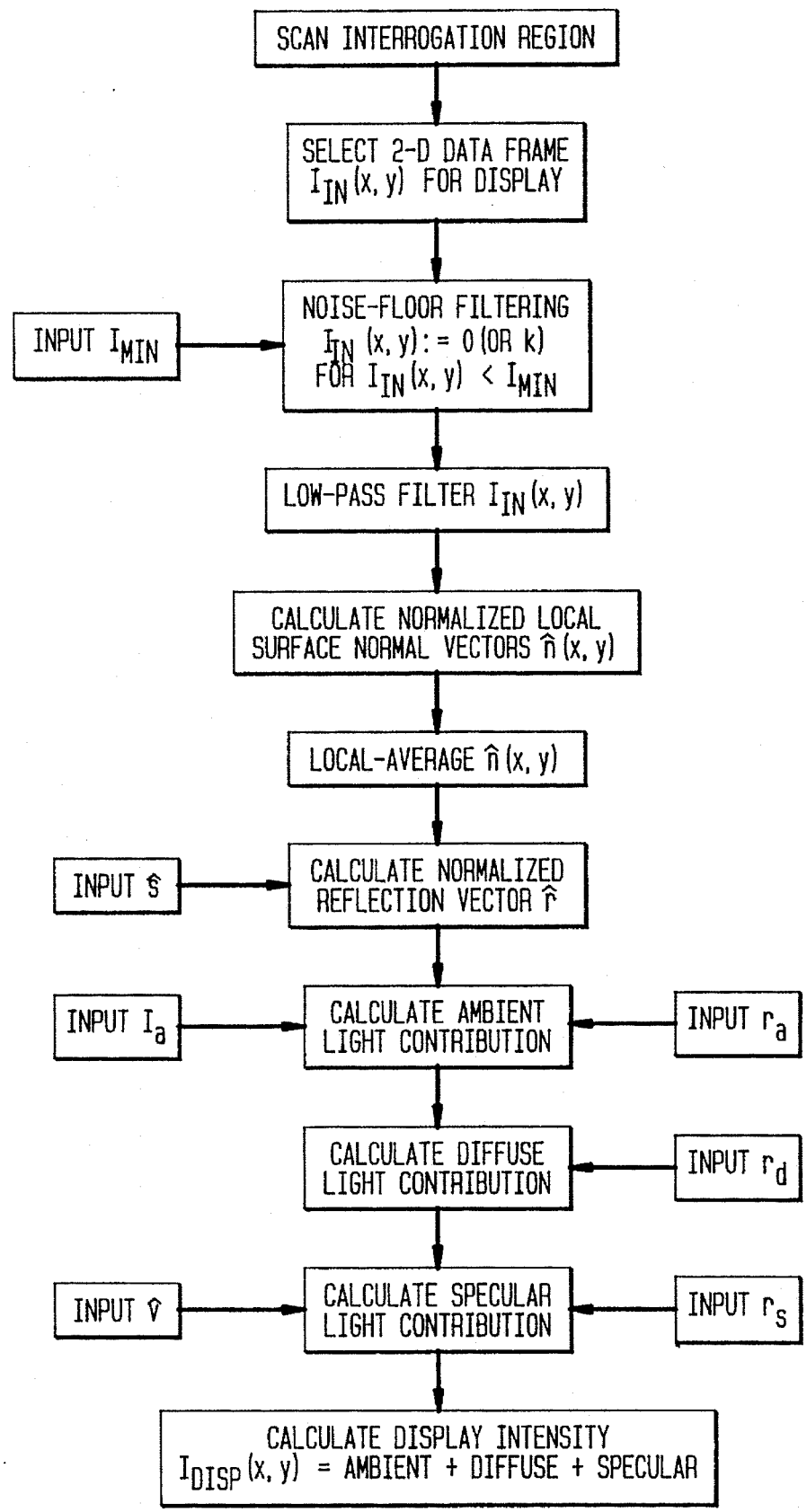
FIG. 5 is a simplified flow chart of the main steps of the method according to the invention.

FIG. 5 is a simplified flow chart of the method according to the invention. Parameters that the user will normally want to adjust often or "iteratively" (repeatedly while looking at a displayed image frame, until the frame most clearly shows structure) are indicated as inputs to the left of the main operational flow. Note that the processor can enter this routine either at the beginning, for each new scan, or for each new selected 2-D frame, or at any point where there is a user input parameter such as $I_a$ or a pre-stored parameter such as the radiance coefficients. The processor then need only perform the steps afterwards, and may use the most recently entered values of other parameters.

I claim:

1. A method for generating and displaying an image of an interrogation region of a patient's body comprising the following steps:

scanning the interrogation region with an ultrasonic probe;

sensing ultrasonic return signals returned from the interrogation region;

generating at least one input data frame representing the scanned interrogation region as a pattern of image elements, each image element having a corresponding input intensity value, and with the input intensity values stored as an input intensity array;

generating a pattern of displayed intensity values as a combination of a predetermined geometry-independent function of the input intensity values and a predetermined geometry-dependent function of the input intensity values, wherein the geometry-dependent function includes a coefficient term that multiplies the input intensity array and that itself is a function of the input intensity values; and displaying the scanned interrogation region as the pattern of displayed intensity values.

2. A method as defined in claim 1, further including the following steps:

for each of a plurality of the image elements, calculating an intensity surface normal vector; and generating the pattern of displayed intensity values also as a predetermined function of the intensity surface normal vectors, which are included in the geometry-dependent function.

3. A method as defined in claim 2, further including the following steps:

designating the image elements sequentially as a current image element; averaging the intensity surface normal vectors for a plurality of image elements in a region surrounding and including the current image element; and setting the intensity surface normal vector of the current image element equal to the average of the intensity surface normal vectors for the region surrounding and including the current image element.

4. A method as defined in claim 3, further including the following steps:

for each image element whose input intensity value is less than a predetermined intensity threshold value, setting the input intensity value to a predetermined intensity default value;

low-pass filtering the input intensity values before generating the geometry-dependent function;

selecting an assumed light source vector;

selecting an assumed viewer direction vector; and generating the pattern of displayed intensity values also as a predetermined function of the assumed light source vector and the assumed viewer direction vector, which are included in the geometry-dependent function.

5. A method as defined in claim 4, in which the displayed intensity values are generated as follows:

$$I_{disp}(x,y) \propto I_a(x,y)r_a + I_{in}(x,y) \cdot [r_d(\hat{s}\cdot\hat{n}) + r_s(\hat{r}\cdot\hat{v})]$$

where:

$I_{disp}(x,y)$=the displayed intensity value for the image element at a position (x,y);
$I_a(x,y)$=an ambient light input intensity array;
$r_a$=a predetermined radiance coefficient for ambient light;
$r_d$=a predetermined radiance coefficient for diffuse light;
$r_s$=a predetermined radiance coefficient for specular light;
$I_{in}(x,y)$=the input intensity value for the image element at position (x,y);
$\hat{s}$=the assumed light source vector, normalized;
$\hat{n}$=the surface normal vector, normalized for the image element at (x,y);
$\hat{v}$=the assumed viewer direction vector, normalized;
$\hat{r}$=a reflection vector for specular lighting defined as:

$$\hat{r} = \frac{\bar{r}}{|\bar{r}|}, \text{ where } \bar{r} = 2(\hat{n}\cdot\hat{s})\hat{n} - \hat{s} \text{ and } |\bar{r}| = \text{the magnitude of } \bar{r} = \sqrt{\bar{r}\cdot\bar{r}}$$

and the dot . indicates the scalar vector product.

6. A method as defined in claim 2, further including the following step:

for each image element whose input intensity value is less than a predetermined intensity threshold value, setting the corresponding input intensity value to a predetermined intensity default value.

7. A method as defined in claim 2, further including the step of low-pass filtering the input intensity values before generating the displayed intensity values.

8. A method as defined in claim 2, further including the following steps:

selecting an assumed light source vector; and generating the pattern of displayed intensity values also as a predetermined function of the assumed light source vector, which is included in the geometry-dependent function.

9. A method as defined in claim 2, further including the following steps:

selecting an assumed viewer direction vector; and generating the pattern of displayed intensity values also as a predetermined function of the assumed viewer direction vector, which is included in the geometry-dependent function.

10. A method as defined in claim 2, further including the following steps:

selecting an ambient light radiance coefficient; and generating the pattern of displayed intensity values also as a predetermined function of the ambient light radiance coefficient, which is included in the geometry-independent function.

11. A system for generating and displaying an image of an interrogation region of a patient's body comprising:

ultrasonic probe means for scanning the interrogation region and for sensing ultrasonic return signals returned from the interrogation region;

reception means for generating at least one input data frame representing the scanned interrogation region as a pattern of image elements, each image element having a corresponding input intensity value;

processing means for calculating a pattern of displayed intensity values as a combination of a predetermined geometry-independent function of the input intensity values and a predetermined geometry-dependent function of the input intensity values, wherein the geometry-dependent function includes a coefficient term that multiplies the input intensity array and that itself is a function of the input intensity values; and display means for displaying the scanned interrogation region as a pattern of the displayed intensity values.

12. A system as defined in claim 11, in which the processing means is further provided:

for calculating an intensity surface normal vector for each of a plurality of the image elements;

for designating the image elements sequentially as a current image element;

for averaging the intensity surface normal vectors for a plurality of image elements in a region surrounding and including the current image element;

for setting the intensity surface normal vector of the current image element equal to the average of the intensity surface normal vectors for the region surrounding and including the current image element; and for generating the pattern of displayed intensity values also as a predetermined function of the intensity surface normal vectors, which are included in the geometry-dependent function.

13. A system as defined in claim 12, further comprising:

light source selection means for setting an assumed light source vector;

viewer direction selection means for setting an assumed viewer direction vector;

in which the processing means is further provided for calculating the displayed intensity values also as a predetermined function of the assumed light source vector and the assumed viewer direction vector, which are included in the geometry-dependent function.

14. A system as defined in claim 11, further comprising:

noise-floor selection means for setting an intensity threshold value;

in which the processing means is further provided for setting, for each image element whose input intensity value is less than the intensity threshold value, the input intensity value to a predetermined intensity default value.

* * * * *